United States Patent [19]

Dixon et al.

[11] Patent Number: 5,084,231
[45] Date of Patent: Jan. 28, 1992

[54] CYLINDRICAL REFUELING MAST WITH LONGITUDINAL GUIDE GROOVES

[75] Inventors: Robert C. Dixon, Morgan Hill; James R. Punches, San Jose; David L. Rousar, San Jose; David L. Faulstich, San Jose, all of Calif.

[73] Assignee: General Electric Company, San Jose, Calif.

[21] Appl. No.: 388,175

[22] Filed: Jul. 31, 1989

[51] Int. Cl.$^5$ ............................................. G21C 19/16
[52] U.S. Cl. ............................ 376/271; 976/DIG. 257
[58] Field of Search ............... 376/271, 268, 264, 262; 212/269, 267; 294/906; 976/DIG. 257

[56] References Cited

U.S. PATENT DOCUMENTS

| | | | |
|---|---|---|---|
| 3,421,635 | 1/1969 | Bunger | 376/271 |
| 3,691,011 | 9/1972 | Kruger | 376/271 |
| 3,768,668 | 10/1973 | Schukei | 376/271 |
| 3,990,591 | 11/1976 | Street et al. | 376/271 |
| 4,082,607 | 4/1978 | Divona | 376/271 |
| 4,086,132 | 4/1978 | Meuschke et al. | 376/271 |
| 4,168,008 | 9/1979 | Granryd | 212/269 |
| 4,311,557 | 1/1982 | Kowalski et al. | 376/271 |
| 4,781,882 | 11/1988 | Salton et al. | 376/271 |

FOREIGN PATENT DOCUMENTS

| | | | |
|---|---|---|---|
| 0291286 | 11/1988 | European Pat. Off. | |
| 2313304 | 12/1976 | France | |
| 1283881 | 8/1972 | United Kingdom | 376/332 |
| 1535412 | 12/1978 | United Kingdom | |
| 2060238 | 4/1981 | United Kingdom | |

OTHER PUBLICATIONS

David Faulstich, "New Refuelling Mast Aims to Increase Efficiency," *Nuclear Engineering International*, Oct. 1989, pp. 51–52.

*Primary Examiner*—Daniel D. Wasil
*Attorney, Agent, or Firm*—Robert R. Schroeder

[57] ABSTRACT

A refueling mast for a reactor complex includes four generally cylindrical tubes. Each inner tube has vertical grooved tracks formed therein. Each outer tube has a guide roller mounted thereon with grooves which mate with track grooves of a respective track on the adjacent inner tube. Track grooves are cold formed moving a roller die tool up and down each inner tube, while increasing pressure on the incorporated die rollers. This process flattens the inner tube where the tracks are being formed. The grooved tracks and the associated flattening provide the torsional rigidity required on the mast tubes for precise positioning and orientation of fuel elements.

5 Claims, 4 Drawing Sheets

CYLINDRICAL REFUELING MAST WITH LONGITUDINAL GUIDE GROOVES

BACKGROUND OF THE INVENTION

The present invention relates to fission reactors and, more particularly, to a refueling mast for a fission reactor. A major objective of the present invention is to provide a refueling mast which is suitable for a boiling water reactor and which is both economical and durable.

Nuclear fission reactors promise to provide abundant energy with far less strain on the environment than fossil fuels. However, since fissionable fuels are hazardous materials, great care must be taken in their transit. This care is especially important within a reactor complex, where fuel elements are transferred between storage area and reactor core. The transfer must be mechanized so that operators are not exposed to radiation.

In some boiling water reactor complexes, fuel elements are in the form of rods which are inserted into a core where the heat-generating fission reaction takes place. Spent fuel elements are transferred to a storage area and fresh fuel elements are transferred from the storage area to the core. The reactor core is situated in a reactor vessel and submersed in water which is circulated to provide for heat transfer. The storage area is also submersed in water in a separate tank, in part because water shields radiation emitted from a fuel element. Typically, the storage tank and the reactor vessel are separated by a barrier, e.g., of concrete.

Transfer of fuel elements can be effected using a trolley, a movable bridge which is moved along tracks and spans the region including the reactor vessel and the storage area. A fuel grapple is used to engage fuel assemblies so that they can be laterally transferred from one area and to release them once they are securely positioned at their destination.

Fuel element transfer requires vertical as well as lateral transfer. Typically, the fuel elements in storage are at a different depth than the fuel elements in the core. Furthermore, fuel elements must be lifted over the barrier between the storage and reactor vessel areas. A gate is typically placed in this barrier, but it provides an opening which is sufficient only to avoid a need to lift a fuel element in transit out of the water.

Vertical movement can be effected using a "refueling mast", typically a vertically telescoping assembly including nested tubes. The outer tube is fixed, nested inner tubes extend downward from and retract into the outer tube. To transfer fuel elements in and out of the core, the refueling mast must permit precise positioning and orienting of the grapple even when the mast is fully extended. In other words, the mast should be sufficiently rigid so that the drag induced by relative movement through water does not bend or twist the mast significantly. This rigidity is desirable to reduce settling time after lateral moves and to improve the operator's "feel" and control over fuel assembly position. In addition, the refueling mast should be sufficiently strong to resist impact damage during possible accidental collisions with vessel components. Such damage can require repair or replacement of the refueling mast, in either case, causing expense and down-time for the reactor complex.

Some refueling masts incorporate telescoping steel tubes having square cross-sections. The walls of the tubes can be ½" to ⅝" thick, providing strength and rigidity. The square cross sections contribute to torsional rigidity. Because precision, corrosion-resistant, square tubing is not widely available, these refueling masts are very expensive. In addition, the several thick square tubes constituted very massive refueling mast.

A more lightweight and economical refueling mast has been fabricated by welding small cylindrical trusses together, defining a skeletal "tube" of triangular cross-section. While formed of readily available cylindrical tubing, these refueling masts do incur the added cost of hand welding the trusses together. More seriously, these trussed refueling masts are readily damaged by accidental impacts and require repair and/or replacement more frequently than is desirable.

What is needed is a more economical refueling mast which provides the strength required to resist impact damage, and the translational and torsional rigidity to limit bending and twisting of the mast due to hydrodynamic drag. A method is desired for forming such a mast using readily available components and relatively inexpensive assembly procedures.

SUMMARY OF THE INVENTION

In accordance with the present invention, a refueling mast comprises cylindrical telescoping tubes with grooved longitudinal (vertical) tracks formed in the outer surface of each of the inner tubes. Grooved guide rollers on each of the outer tubes engage respective grooved tracks of the next inner tube to provide a centralizing action and to prevent relative rotation between the tubes at the roller to tube interface.

The grooved tracks can be cold formed by rolling roller dies longitudinally along the outer surface of a cylindrical tube repeatedly. The pressure applied to the rollers is increased with successive transversals until the grooves are formed in the cylinders as desired. In addition to forming the track grooves, the process can flatten and harden the steel tubes along the tracks. The track grooves, the engagement of the guide rollers, the flattening and the hardening all contribute to torsional rigidity. Tracks on successive tubes can be radially aligned upon assembly of the refueling mast to ensure a compact nesting of tubes.

The precision, corrosion-resistant, cylindrical tubes to which this method is applied are readily available, and thus are available at relatively low cost. The process of forming the track grooves is relatively inexpensive compared to the assembly of a "tube" from trusses. The desired strength and translational rigidity is provided by the steel tubes. Moreover, the system of track grooves and rollers provides a highly compact design that further increase mast rigidity, provides smoother operational tracking, and improves operator visibility. The enclosed assembly significantly reduces exposures by shielding a bridge operator from contaminated lower sections and by minimizing water drip. These and other features and advantages of the present invention are described below with reference to the following drawings.

DESCRIPTION OF THE PREFERRED EMBODIMENTS

Figure 1:
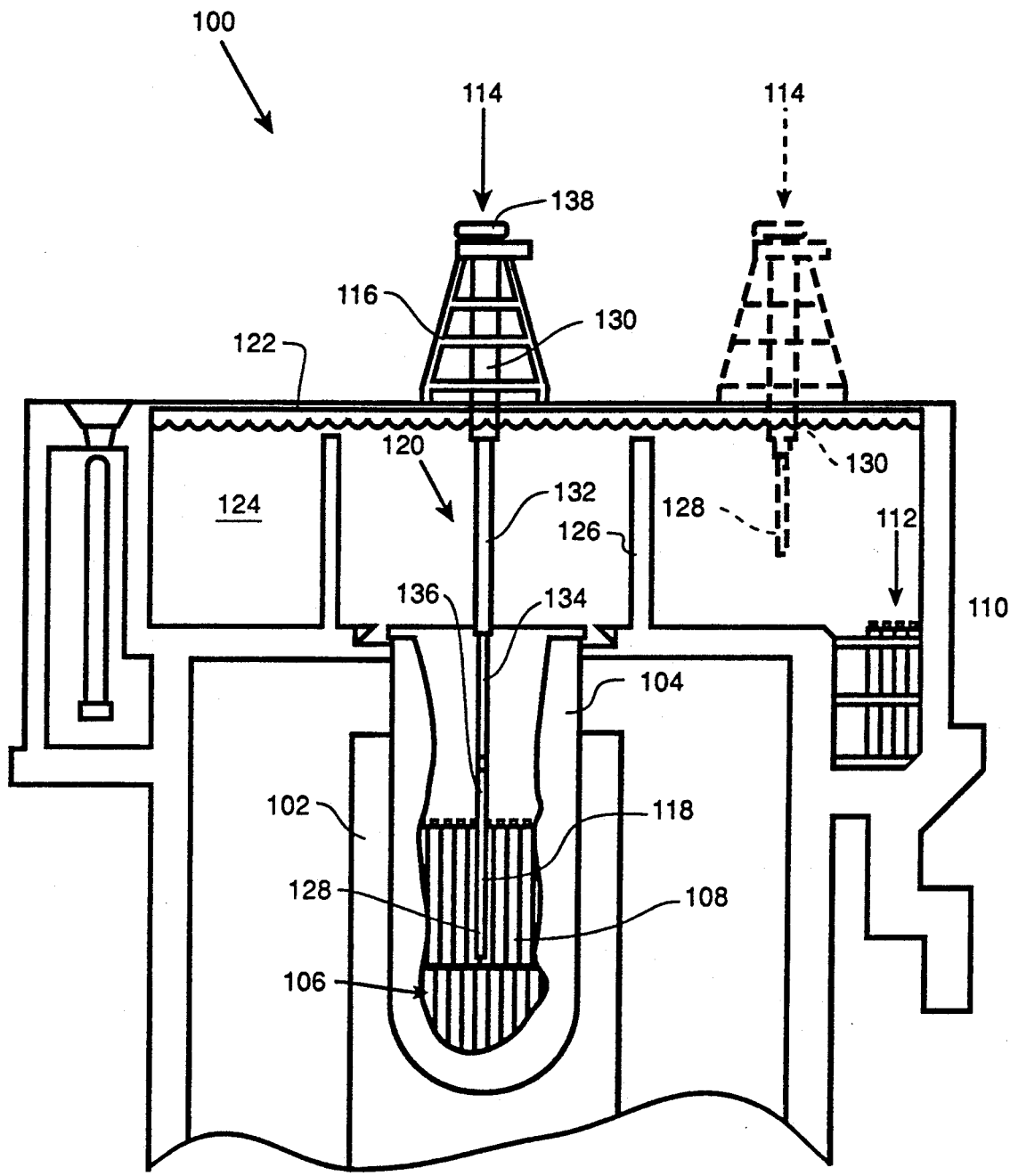
FIG. 1 is a schematic side view of a portion of a fission reactor complex depicting the operation of a refueling mast in accordance with the present invention.

A fission reactor complex 100 includes a concrete containment structure 102 enclosing a reactor vessel 104 containing a reactor core 106, as shown in FIG. 1. Reactor core 106 includes a frame for holding a multitude of fuel elements 108 in position to promote a controlled chain reaction. Additional fuel elements 110 are stored in a storage area 112.

Fuel elements are transferred between storage area 112 and core 106 by a transfer mechanism 114 which includes a conventional refueling bridge 116, a conventional grapple 118, and an interconnecting refueling mast 120. Bridge 116 is moved on tracks on a refueling floor 122 which extends over water 124 which submerses storage area 112 and core 106. A gate 126 can be opened to permit a fuel element to be transferred between storage area 112 and core 106 without lifting the fuel element out of water 124.

Mast 120 is shown in an extended condition over core 106 so that it can deposit a fuel element 128 therein. Mast 120 includes four tubes: an outermost tube 130, a first intermediate tube 132, a second intermediate tube 134 and an innermost tube 136 are visible when mast 120 is extended. Intermediate tubes 132 and 134 are referred to herein as "inner tubes" in relation to outermost tube 130 and as "outer tubes" in relation to innermost tube 136. Shown in dashed lines are transfer mechanism 114 and fuel element 128 in a prior position in transit from storage area 112 to core 106 with mast 120 in a retracted condition.

Bridge 116 includes a hoist mechanism 138 which provides for extension and retraction of the inner tubes 132, 134 and 136, as well as control of grapple 118. Hoist mechanism 138 is linked to innermost tube 136 through hoist cables 202, shown in FIG. 2. A respective flange 210, 212, 214, 216 is welded to the lowermost end of each tube 130, 132, 134, 136. As hoist mechanism 138 forces innermost tube 136 to retract from a fully extended condition, innermost tube 136 slides within and relative to intermediate tube 132 until flange 214 is contacted by grapple mounting bolts on flange 216. Further retraction causes tubes 134 and 136 to retract together and slide within and relative to tube 132 until flange 214 contacts flange 212. Inner tubes 132, 134 and 136 retract together into outermost tube 130 until flange 212 contacts flange 210 which serves as the stop for retraction.

Figure 2:
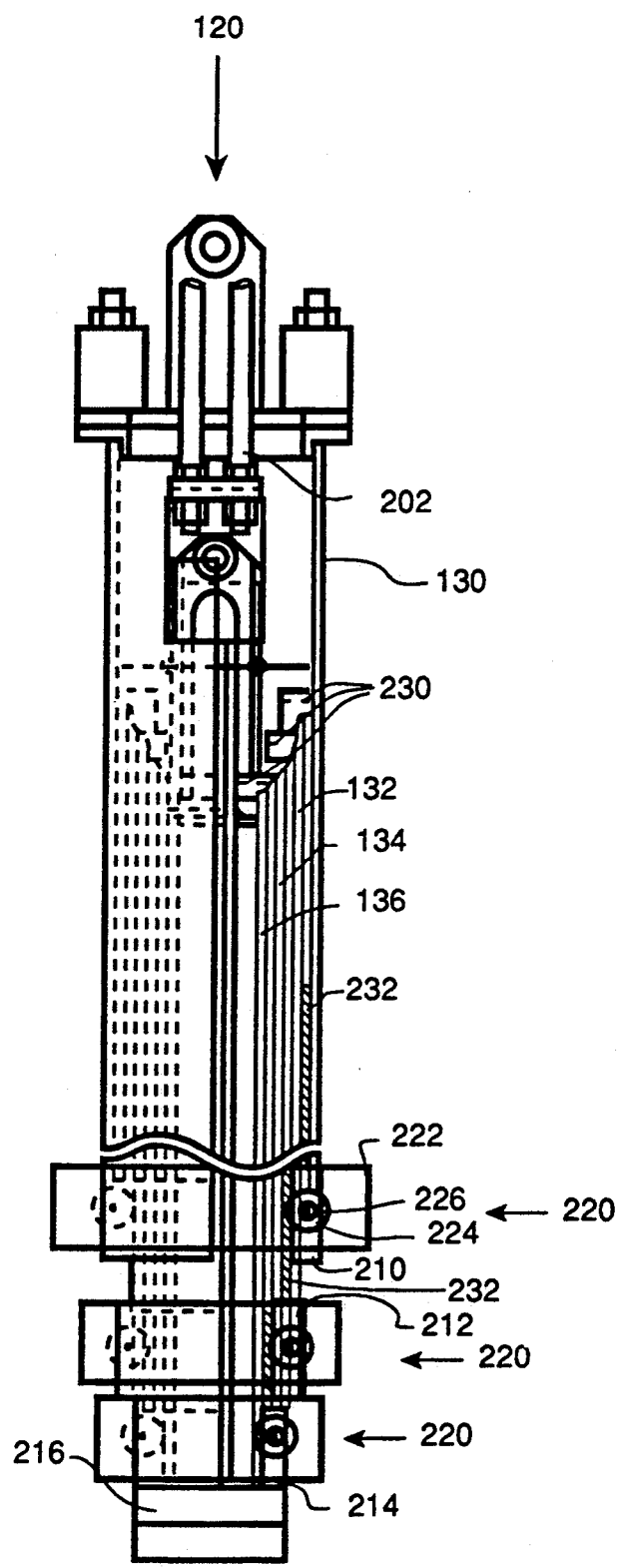
FIG. 2 is a sectional view of a refueling mast in a retracted condition and in accordance with the present invention
Figure 3:
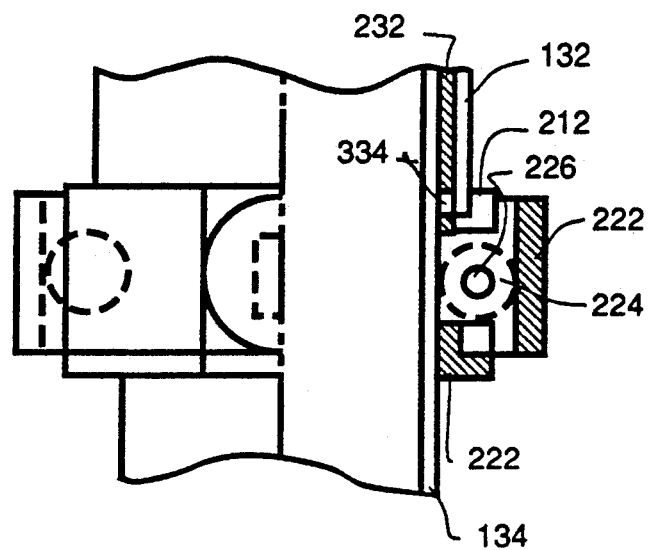
FIG. 3 is a sectional view of a tube-tube interface of the refueling mast of FIG. 2.

Four roller assemblies 220 are bolted to and circumferentially spaced around each outer flange 210, 212 and 214. Each roller assembly 220 comprises a roller housing 222, a guide roller 224 and an axle 226 used for rotatably attaching the roller 224 to the roller housing 222, as indicated in FIGS. 2 and 3. Guide rollers 224 help centralize inner tubes 130, 132 and 134. Further guidance is provided by bushings 230 on the top ends of inner tubes 132, 134 and 136 and sleeves 232 attached to the inner surfaces of outer tubes 130, 132 and 134. Sleeves 232 are held in place by portions of roller housings 222 which protrude through respective flanges 210-214. Sleeves 232 serve as downward stops for inner tubes 132-136 as they define the lower limit of travel for bushing 230. As shown in FIG. 3, springs 334 space sleeves 232 from roller housings 222.

Figure 4:
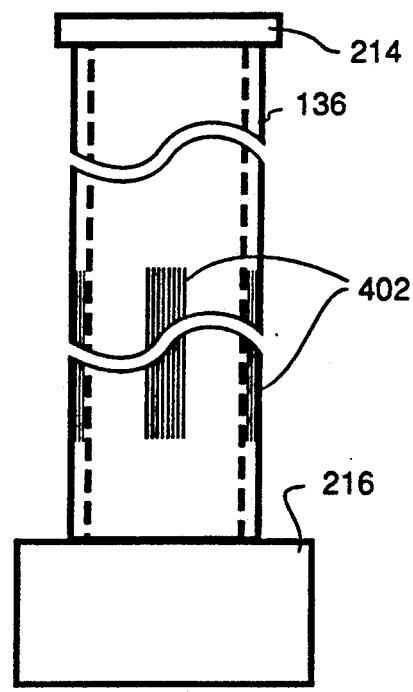
FIG. 4 is a schematic elevation view of an inner tube of the refueling mast of FIG. 2.

As indicated with respect to innermost tube 136 in FIG. 4, each inner tube 132, 134, 136, has multiple grooved longitudinal (vertical) tracks 402 formed thereon. More specifically, each outer flange 210, 212, 214 supports four guide rollers 224 for engaging four tracks 402 of the next inner tube 132, 134, 136. As indicated in FIG. 5, rollers 224 have grooves 506 for mating with grooves 504 of tracks 402.

Figure 6:
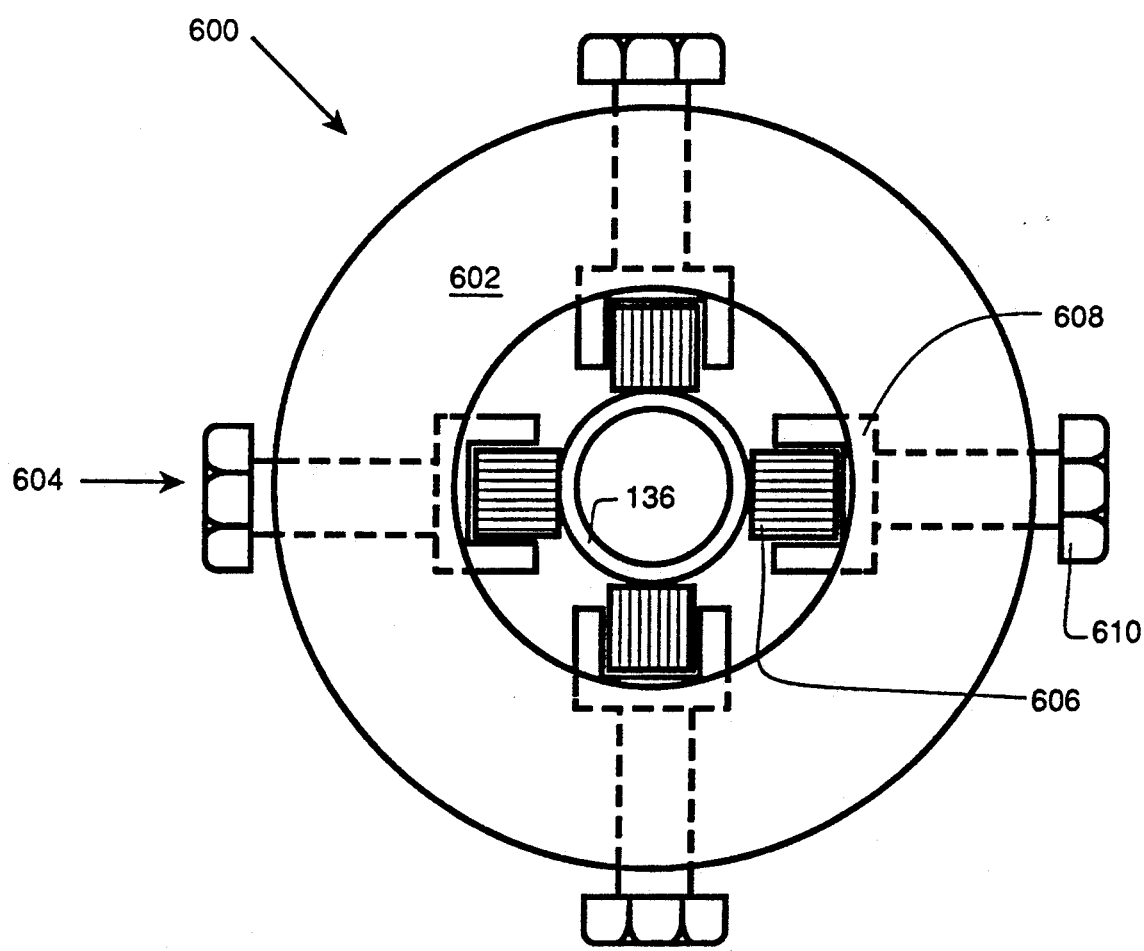
FIG. 6 is a schematic sectional view illustrating a groove forming tool in place on the inner tube of FIG. 4.

Grooved tracks 402 are cold-formed using a groove forming tool 600, shown in FIG. 6. Tool 600 includes an annular die holding fixture 602 and four die assemblies 604 evenly spaced about the circumference of fixture 602. Each die assembly 604 includes a roller die 606, mounting 608 for holding roller die 606 and permitting it to rotate, and a bolt 610 which is welded to mounting 608. Roller dies 606 can be of a hardened tool steel. Threads of each bolt 610 are engaged with mating threads of fixture 602 so that turning a bolt 610 forces the respective roller die 606 in or out as desired.

To form grooved tracks 402, tool 600 is mounted on a tube, e.g., tube 136, at a longitudinal position at which tract 402 is to be formed. Bolts 610 are adjusted so that roller dies 606 contact the outer surface of tube 136. Tool 600 is then moved repeatedly over the length of tube 136 over which track 402 is to be defined. Bolts 610 are gradually tightened between traversals, increasing the pressure with which roller dies 606 apply to tube 136. Grooved tracks 402 are formed progressively in this manner.

Figure 5:
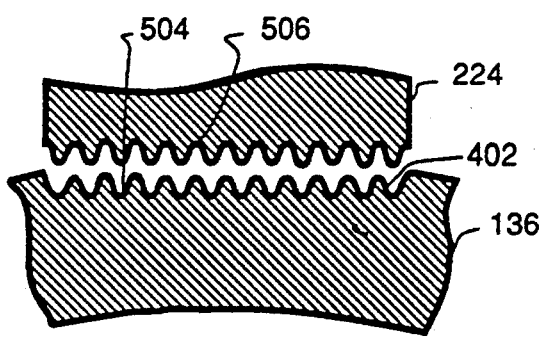
FIG. 5 is a sectional view of the inner tube of FIG. 4 and a guide roller which is shown separated from engagement for clarity.

As depicted in FIG. 5, this process results a flattening of tubes 132, 134 and 136 on which tracks 402 are formed and along the regions in which tracks 402 are formed. In addition, the cold forming hardens the steel of the tube being worked. This hardening and flattening contribute to the torsional rigidity of the tube.

Tubes 130, 132, 134 and 136 have respective diameters of about 3", 4", 5" and 6" respectively, with wall thicknesses of ¼". These dimensions provide for "nestability" of tubes 130-136. The tubes are fabricated using stainless steel 304. Individual tube lengths are about 20' each, providing a retracted mast length of about 21' and an extended length of about 69 ft. The dimensions and materials listed above can be varied according to the context. Tracks 402 can be cold formed or machined. Other variations upon and modifications to the disclosed embodiments are provided by the present invention, the scope of which is limited only by the following claims.

What is claimed is:

1. A refueling mast for refueling a nuclear reactor, said mast comprising:
    plural longitudinally extending cylindrical tubes including an outermost tube and at least a first inner tube, said first tube having a first outer surface and being relatively dimensioned so that said inner tube can be slid within and relative to said outermost tube;
    said first inner tube having a first set of longitudinally extending tracks formed at said first outer surface, each of said tracks of said first set having longitudinally extending grooves;

telescoping means for causing said first inner tube to slide within and relative to said outermost tube; and first guide means for guiding longitudinal movement of said first inner tube relative to said outermost tube, said first guide means including grooved rollers which mate with said first set of longitudinally extending tracks, said first guide means being mechanically coupled to said outermost tube so as to maintain a fixed longitudinal position relative thereto.

2. A refueling mast as recited in claim 1 further comprising:

a second inner tube, said second inner tube having a second outer surface and having a second set of longitudinally extending tracks formed at said second outer surface, each of said tracks of said second set having longitudinally extending grooves, each of said second set of tracks being radially aligned with a respective one of said set of tracks; and second guide means for guiding longitudinal movement of said second inner tube relative to said outermost tube, said second guide means including grooved rollers which mate with said second set of longitudinally extending tracks, said second guide means being mechanically coupled to an outer tube so as to maintain a fixed longitudinal position relative thereto.

3. A refueling mast as recited in claim 1 wherein said first inner tube is flattened in the location of said tracks.

4. A refueling system comprising:

plural longitudinally extending cylindrical tubes including an outermost tube and plural inner tubes, said inner tubes including a first inner tube relatively dimensioned so that said first inner tube can be slid within and relative to said outermost tube, and a second inner tube relatively dimensioned so that said second inner tube can be slid within and relative to said first inner tube, said first inner tube having a first outer surface and said second inner tube having a second outer surface;

said first inner tube having a first set of longitudinally extending tracks formed therein at said first outer surface;

said second inner tube having a second set of longitudinally extending tracks formed therein at said second outer surface, each of said tracks of said first and second sets having longitudinally extending grooves, each of said second set of tracks being radially aligned with a respective one of said first set of tracks;

hoist means for causing each inner tube to move within and relative the next radially outward and adjacent of said tubes;

guide means for guiding longitudinal movement of each of said inner tubes, said guide means for each of said inner tubes including grooved rollers mounted on the next radially outward and adjacent of said tubes, each of said grooved rollers mating with a respective one of said grooved tracks;

a fuel grapple attached to one of said inner tubes, said fuel grapple being adapted for engaging and lifting fuel elements; and transit means for moving said tubes laterally;

whereby said hoist means can cause said inner tubes to protract and retract relative to said outermost tube so as to raise and lower said fuel grapple, said transit means providing for movement of fuel elements between a storage area and a reactor core in a fission reactor complex.

5. The assembly of claim 4 wherein said inner tubes are flattened in the location of said tracks.

* * * * *